(12) United States Patent
Omura (10) Patent No.: US 9,832,982 B2
(45) Date of Patent: Dec. 5, 2017

(54) MOVABLE HOOD FOR REEL SEAT, REEL SEAT, AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka-shi (JP)

( * ) Notice: Subject to any disclaimer, the term of this patent is extended or adjusted under 35 U.S.C. 154(b) by 0 days.

(21) Appl. No.: 14/910,978

(22) PCT Filed: Sep. 2, 2014

(86) PCT No.: PCT/JP2014/073030
§ 371 (c)(1),
(2) Date: Feb. 8, 2016

(87) PCT Pub. No.: WO2015/037470
PCT Pub. Date: Mar. 19, 2015

(65) Prior Publication Data
US 2016/0198689 A1    Jul. 14, 2016

(30) Foreign Application Priority Data

Sep. 10, 2013 (KR) .................. 10-2013-0108609
May 29, 2014 (KR) .................. 10-2014-0065032

(51) Int. Cl.
*A01K 87/06* (2006.01)
*A01K 89/01* (2006.01)
*A01K 87/00* (2006.01)

(52) U.S. Cl.
CPC ........ *A01K 89/01127* (2015.05); *A01K 87/00* (2013.01)

(58) Field of Classification Search
CPC ... A01K 89/01127; A01K 87/06; A01K 87/00
See application file for complete search history.

(56) References Cited

U.S. PATENT DOCUMENTS 4,756,114 A * 7/1988 Ohmura ............... A01K 87/06
                                                       43/22
5,600,915 A * 2/1997 Ohmura ............... A01K 87/06
                                                       43/22
(Continued)

FOREIGN PATENT DOCUMENTS

EP    1 588 613 A1    10/2005
JP    2548017 Y2      9/1997
(Continued)

OTHER PUBLICATIONS

International Search Report dated Dec. 9, 2014, in PCT/JP2014/073030 filed Sep. 2, 2014.
2013 Shimano Fishing Tackle Catalog, Jan. 23, 2013, (1 page).

*Primary Examiner* — Christopher P Ellis
*Assistant Examiner* — Jessica B Wong
(74) *Attorney, Agent, or Firm* — Oblon, McClelland, Maier & Neustadt, L.L.P.

(57) ABSTRACT

A movable hood for a reel seat has a hood portion and a nut portion. A body of a reel seat passes through the hood portion. The hood portion is movable in a longitudinal direction of the body. The nut portion is connected to the hood portion to rotate around the body and is threadedly coupled to an outer peripheral surface of the body at an inner peripheral surface. The hood portion has a base end facing the nut portion and a leading end located opposite the base end. When viewing the hood portion from side, a length of an upper side of the hood portion from the base end to the leading end is longer than a length of a lower side of the hood portion from the base end to the leading end, and an upper contour of the hood portion has an upward convex curve line.

12 Claims, 8 Drawing Sheets

(56) References Cited

U.S. PATENT DOCUMENTS

| | | |
|---|---|---|
| 5,904,000 A | 5/1999 | Ohmura |
| 2004/0088900 A1* | 5/2004 | Irrgang .................. A01K 87/08 43/23 |

FOREIGN PATENT DOCUMENTS

| | | |
|---|---|---|
| JP | 3053767 B2 | 6/2000 |
| JP | 2001-061381 A | 3/2001 |
| JP | 3654566 B2 | 6/2005 |
| JP | 2007-282596 A | 11/2007 |
| JP | 2008-220213 A | 9/2008 |
| JP | 2009-268416 A | 11/2009 |
| JP | 2011-010593 A | 1/2011 |
| JP | 4767438 B2 | 9/2011 |
| KR | 10-2009-0107399 A | 10/2009 |

* cited by examiner

MOVABLE HOOD FOR REEL SEAT, REEL SEAT, AND FISHING ROD INCLUDING SAME

CROSS-REFERENCE TO RELATED APPLICATIONS

This application is a 35 U.S.C §371 national stage filing of International Application No. PCT/JP2014/073030, filed on Sep. 2, 2014, which claims the benefit of Korean Patent Application No. 2013-0108609, filed on Sep. 10, 2013 and Korean Patent Application No. 2014-0065032, filed on May 29, 2014, the entire contents of each of which are incorporated by reference herein.

TECHNICAL FIELD

The present disclosure relates to a movable hood for clamping an attachment leg of a reel to a body of a reel seat. Further, the present disclosure relates to a reel seat and a fishing rod including such a movable hood.

BACKGROUND

A reel for a fishing rod such as a spinning reel, a bait casting reel, etc. is mounted to a fishing rod by means of a reel seat. By way of example of a reel seat, there exists a plate-shaped reel seat, which is attached on an outer surface of a fishing rod, or a cylinder-shaped reel seat, through which a fishing rod passes.

Figure 1:
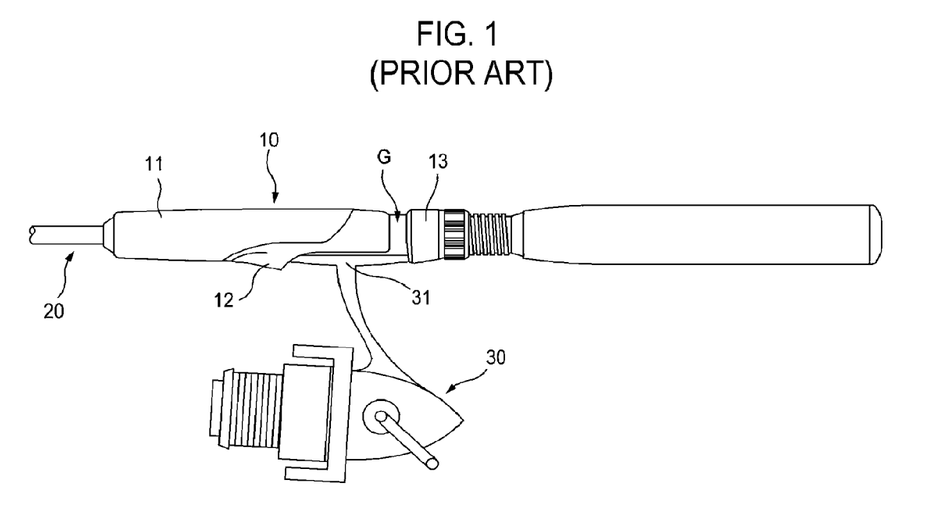
FIG. 1 is a side view showing a movable hood of a prior art which fixes a spinning reel to a reel seat.
Figure 2:
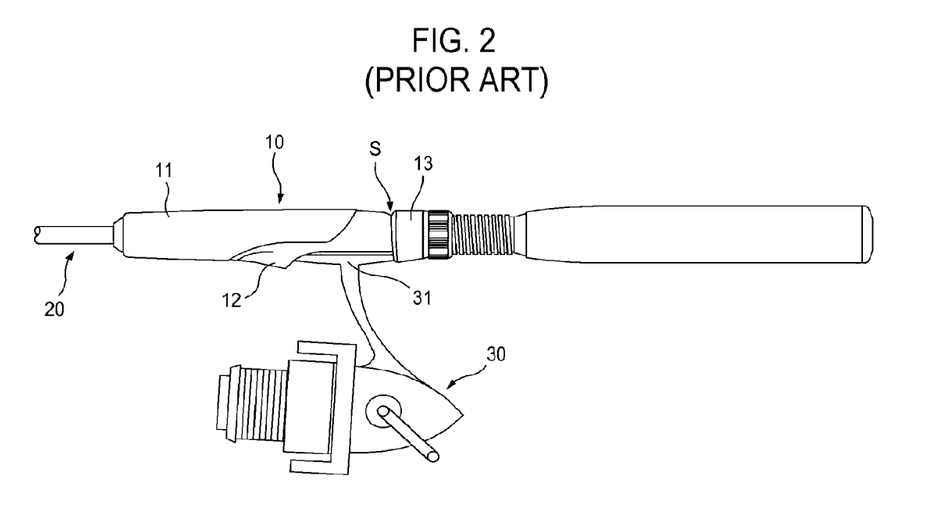
FIG. 2 is a side view showing another movable hood of a prior art which fixes a spinning reel to a reel seat.

For example, as shown in FIGS. 1 and 2, the cylinder-shaped reel seat has a fixed hood 12 and a movable hood 13 for clamping attachment legs 31 of a reel 30 to a body 11 of a reel seat 10. The movable hood 13 has a shape of a ring that is movable along the body 11 of the reel seat. The reel 30 is mounted on the reel seat 10 by clamping one of the attachment legs 31 of the reel to the body 11 through the fixed hood 12, and clamping the other of the attachment legs 31 of the reel to the body 11 through the movable hood 13.

When a user holds a fishing rod 20 with the reel 30 mounted thereto, the user grips the reel seat 10 while positioning the attachment legs 31 of the reel between fingers, and the user's palm and fingers are contacted with an outer surface of the fixed hood 12 or the movable hood 13 and an outer surface of the body 11. When the reel 30 is fixed to the body 11, a gap (for example, a portion indicated by a symbol G in FIG. 1) exists between the body 11 and the movable hood 13 or a stepped portion (for example, a portion indicated by a symbol S in FIG. 2) exists due to an unevenness between the outer surface of the body 11 and the outer surface of the movable hood 13. Thus, the user may feel such irritative and unpleasant feelings if the user touches a protrusion with the user's palm or fingers, and cannot hold the fishing rod 20 with a stable grip feeling. A reel seat which reduces irritative and unpleasant feelings and enhances a grip feeling is required in the art.

Patent Document 1: Japanese Patent Application Publication No. 2009-268416
Patent Document 2: Japanese Patent Registration Publication No. 3053767

SUMMARY

Japanese Patent Application Publication No. 2009-268416 discloses a reel seat which reduces a stepped portion between a body of a reel seat and a movable hood. According to some embodiments of this disclosure, to reduce the stepped portion between the body and the movable hood, the movable hood has a comb-shaped portion, and the body has an engagement portion for engagement with the comb-shaped portion of the movable hood. However, the comb-shaped portion of the movable hood is weak and therefore tends to separate from the engagement portion of the body to create the stepped portion.

Further, Japanese Patent Registration Publication No. 3053767 discloses a reel seat wherein a concave portion is provided in a movable hood. However, the movable hood with the concave portion can be applied to only a reel seat wherein the movable hood is placed toward a tip of a fishing rod. If the movable hood with the concave portion is applied to a reel seat wherein the movable hood is placed toward a butt of a fishing rod, then the concave portion of the movable hood is positioned under a palm and therefore a grip feeling deteriorates.

When considering a motion of violently swing a fishing rod or a motion of shaking a fishing rod, a reel seat must have a good grip feeling such that the user can stably hold the reel seat instead of reducing an unpleasant feeling on the user's palm. However, the reel seat and the movable hood of the prior art do not provide an enhanced grip feeling and the reduction of an unpleasant feeling. Further, the dedicated movable hood is employed to a reel seat, thus restricting the user's choice on a reel seat. As such, the reel seat and the movable hood of the prior art cannot provide the user with broad choices.

Embodiments of the present disclosure are made to solve the aforementioned problems of the prior art. Embodiments of the present disclosure provide a movable hood for a reel seat, which is applied irrespective of the types of a reel seat, and which enhances a grip feeling while reducing an unpleasant feeling on the user's hand.

Further, embodiments of the present disclosure provide a movable hood which allows the user to make broad choices on a reel seat.

Further, embodiments of the present disclosure provide a reel seat having a good grip feeling by means of the aforementioned movable hood, and a fishing rod including such a reel seat.

One aspect of the present disclosure provides a movable hood which is used with a reel seat for mounting a reel to a fishing rod. In an exemplary embodiment, a movable hood for a reel seat includes: a hood portion through which a body of a reel seat passes, and which is movable in a longitudinal direction of the body and clamps an attachment leg of a reel to the body at a lower side; and a nut portion which is connected to the hood portion so as to rotate around the body and is threadedly coupled to an outer peripheral surface of the body at an inner peripheral surface. The hood portion has a base end facing the nut portion and a leading end located opposite the base end. When viewing the hood portion from side, a length of an upper side of the hood portion from the base end to the leading end is longer than a length of the lower side of the hood portion from the base end to the leading end. Further, when viewing the hood portion from the side, an upper contour of the hood portion includes an upward convex curve line.

In an embodiment, a top point of the convex curve line is located from the base end at a distance of 80% or less of the length of the upper side from the base end to the leading end.

In an embodiment, when viewing the hood portion from the side, a lower contour of the hood portion includes an upward concave curve line.

In an embodiment, when viewing the hood portion from the side, a contour of the leading end between the upper side and the lower side includes a curve line concave toward the base end.

In an embodiment, the hood portion includes first and second bores through which the body of the reel seat passes. The first bore extends from the base end toward the leading end. The second bore has a diameter greater than a diameter of the first bore and extends from the first bore toward the leading end. When viewing the hood portion from front, a step portion is formed between the first bore and the second bore.

In an embodiment, a depth from the leading end to the step portion is in a range of 30% to 70% of the length of the upper side from the base end to the leading end.

In an embodiment, the movable hood for a reel seat further includes an auxiliary hood, at least a portion of which is fitted in between the outer peripheral surface of the body of the reel seat and an inner peripheral surface of the hood portion. The auxiliary hood has an insertion portion which is fitted in between the body of the reel seat and the second bore. Further, in an embodiment, the auxiliary hood has an opening or recess at a lateral side.

In an embodiment, the length of the upper side from the base end to the leading end is 40 mm or less.

Another aspect of the present disclosure is related to a reel seat. In an exemplary embodiment, a reel seat includes: a body through which a portion of a fishing rod passes in a longitudinal direction, and which includes a seat portion, on which a pair of attachment legs of a reel are seated, at a lower side, and a male thread in an outer peripheral surface of one end portion; the movable hood according to above-described embodiments, which is located at one of both ends in the longitudinal direction of the body and clamps one of the pair of attachment legs to the seat portion of the body; and a fixed hood which is located at the body opposite the movable hood and clamps the other of the pair of the attachment legs to the seat portion of the body. The nut portion of the movable hood is threadedly coupled to the male thread at an inner peripheral surface of the nut portion.

A further aspect of the present disclosure is related to a fishing rod. The fishing rod includes the movable hood for a reel seat according to the above-described embodiments or the above-described reel seat.

According to the movable hood according to the embodiments, the length of the upper side of the hood portion is longer than the length of the lower side of the hood portion, which is opposite to the upper side and clamps the attachment leg of the reel, and the upper contour has the upward convex curve line. Thus, the movable hood with the enhanced grip feeling can be applied to all of the rear and front ends of the reel seat. Where the movable hood according to an embodiment is applied to the rear end of the reel seat, the gap is eliminated between the movable hood and the user's palm. Where the movable hood according to an embodiment is applied to the front end of the reel seat, the user can strongly contact the user's thumb finger with the upper side of the hood portion. Further, since the leading end contour and the lower contour of the hood portion are a concave curve line, the user's fingers can be guided to a suitable position when the user's fingers are in contact with the hood portion. As such, the reel seat according to the embodiments accomplishes a reel seat which reduces an unpleasant feeling and enhances a grip feeling. Further, due to the step portion formed inside the hood portion as well as the auxiliary hood fitted in between the body of the reel seat and the hood portion, a grip feeling of the reel seat can be maintained and the user's choices on a reel seat can be broadened.

DETAILED DESCRIPTION

Descriptions are made as to embodiments of a movable hood for a reel seat according to the present disclosure and embodiments of a reel seat and a fishing rod including the same according to the present disclosure with reference to FIGS. 3 to 13. In FIGS. 3 to 13, like reference numerals denote like or corresponding elements or parts.

Figure 3:
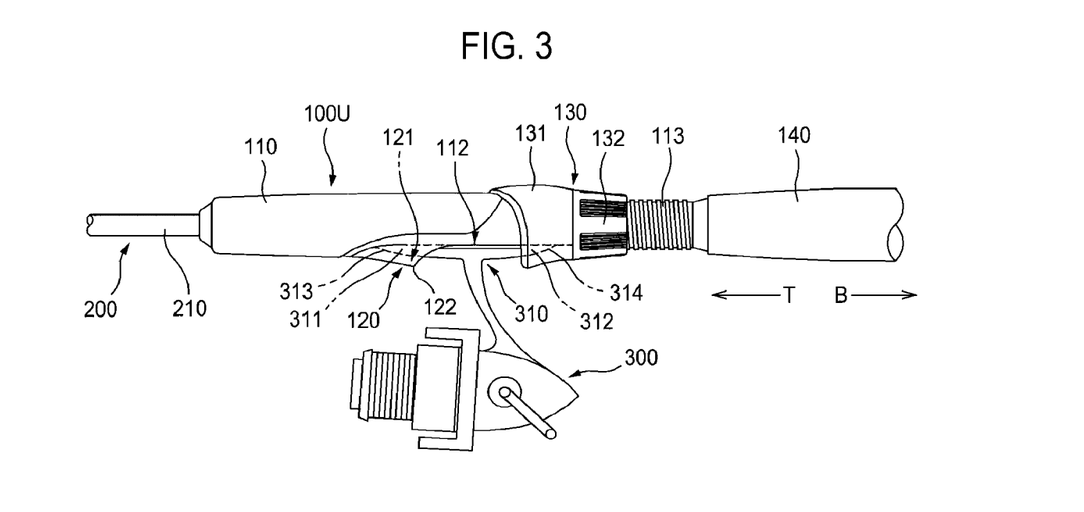
FIG. 3 is a side view showing that a movable hood according to an embodiment of the present disclosure is coupled to a rear end portion of a reel seat and a reel is fixed to a reel seat through the movable hood.

The directional term "frontward," "front" or the like as used herein means a direction directed toward a tip of a fishing rod (e.g. a direction indicated by an arrow T in FIG. 3), while the directional term "rearward," "rear" or the like means a direction directed toward a butt of the fishing rod (e.g. a direction indicated by an arrow B in FIG. 3). Further, as used herein, the directional term "downward," "lower" or the like is based on a direction in which a reel is mounted on a reel seat, while the directional term "upward," "upper" or the like means a direction opposite to the downward or lower direction.

Further, the term "contour" as used herein refers to a line that is seen at the outermost edge of the element or part constituting a movable hood in the front view or side view of the movable hood. For example, an "upper contour" refers to a line that is located at the uppermost edge of the element or part when viewing the movable hood from the side, and a "lower contour" refers to a line that is located at the lowermost edge of the element or part when viewing the movable hood from the side.

A reel seat 100U according to an embodiment shown in FIG. 3 is used for mounting a spinning reel 300 (hereinafter, briefly referred to as a "reel") to a fishing rod 200. A reel which can be mounted on reel seats according to embodiments is not limited to the spinning reel shown in FIG. 3.

The reel 300 includes a spool around which a fishing line is wound, a handle for rotating the spool, etc. The reel 300 has an attachment leg 310 for attachment to the reel seat 100U. The attachment leg 310 has an approximately T-like shape. The attachment leg 310 includes a front attachment leg 311 and a rear attachment leg 312, which linearly extend, at a leading end of the attachment leg 310. The front attachment leg 311 is shaped such that its cross-sectional area gradually decreases toward its front end, and the rear attachment leg 312 is shaped such that its cross-sectional area gradually decreases toward its rear end. Thus, the front attachment leg 311 has, at its front end portion, an inclined surface 313 which is inclined toward the front end, and the rear attachment leg 312 has, at its rear end portion, an inclined surface 314 which is inclined toward the rear end. The front end portion of the front attachment leg 311 and the rear end portion of the rear attachment leg 312 are inserted to front and rear insertion cavities of the reel seat respectively, which will be described below.

The reel seat 100U includes a body 110, a fixed hood 120 and a movable hood 130. The movable hood 130 is located at one of both ends of the body 110 in a longitudinal direction of the body and is movable in the longitudinal direction of the body 110. The fixed hood 120 is located at the body 110 opposite the movable hood 130. The movable hood 130 clamps one of a pair of attachment legs 310 of the reel 300 to the body 110, while the fixed hood 120 clamps the other of the pair of attachment legs 310 of the reel 300 to the body 110.

The reel seat 100U shown in FIG. 3 is a reel seat of a so-called up lock type, wherein the movable hood 130 is located at the rear end of the body 110 (toward the butt of a fishing rod). In the reel seat of an up lock type, the front attachment leg 311 of the reel 300 is clamped by the fixed hood 120 and the rear attachment leg 312 of the reel 300 is clamped by the movable hood 130.

The body 110, the fixed hood 120 and the movable hood 130 of the reel seat 100U may be made of a resin material or a metallic material. In this embodiment, the entire movable hood 130 of the reel seat 100U is made of a resin material, or at least a portion of the movable hood 130, which clamps the attachment legs 310 of the reel, is made of a resin material.

The body 110 of the reel seat 100U has an approximately cylindrical shape through which a bore 111 (see FIG. 12) extends in a longitudinal direction. A blank 210 of the fishing rod 200 is fitted to the bore 111 of the body 110 and extends through the body 110. Further, by way of example, the body 110 of the reel seat 100U may be fixed to the fishing rod 200 by gluing.

The body 110 has a seat portion 112 (see FIG. 12) for seating the attachment legs 310 of the reel 300 thereon. In this embodiment, said seat portion 112 is formed at a lower side of the body 110, and the attachment legs 310 of the seat portion 112 are seated on the seat portion 112.

The body 110 has, at its one end portion, a male thread 113 formed along an outer peripheral surface of the body. In the example shown in FIG. 3, the male thread 113 is formed at the rear end of the body 110. The male thread 113 is threadedly coupled to a female thread formed in a nut portion 132 of the movable hood 130, which will be described below.

Further, the body 110 has, in its outer peripheral surface, a guide groove 114 (see FIG. 12) for guiding a movement of the movable hood 130 in the longitudinal direction of the body 110. The guide groove 114 extends on an upper side of the body 110 along the longitudinal direction of the body 110 by a predetermined length. In some embodiments, the guide groove 114 of the body 110 extends along the longitudinal direction of the body 110 on a portion other than the upper side of the body 110.

In this embodiment, a grip portion 140 is complementarily coupled to the rear end of the body 110. The grip portion 140 has a cylindrical shape which is coaxial with a bore 111 of the body 110. A blank 210 of the fishing rod 200 is coupled to a central bore of the grip portion by press fitting.

In this embodiment, the fixed hood 120 is integrated with the body 110. The fixed hood 120 has a cover portion 122 which is formed to cover the seat portion 112. The cover portion 122 is shaped such that a downward height gradually increases toward the rear end. Thus, a front insertion cavity 121, to which one of the attachment legs 310 of the reel 300 is inserted, is defined between the seat portion 112 of the body 110 and the fixed hood 120. A cross-sectional shape of the front insertion cavity 121 is an approximately circular arc and its vertical width gradually decreases toward the front of the body 110. Therefore, an inside surface of the cover portion 122 of the fixed hood 120 is in contact with the inclined surface 313 of the front end portion of the front attachment leg 311. In some embodiment, the fixed hood 120 may be manufactured as an individual part and may be attached to the body 110.

The movable hood 130 used for the reel seat 100U is described with reference to FIGS. 4 to 7.

The movable hood 130 is formed in a shape of a ring. The body 110 of the reel seat 100U is fitted to the movable hood 130 and passes through the movable hood 130. The movable hood 130 includes a hood portion 131, which is linearly movable along the longitudinal direction of the body 110 but does not move in a circumferential direction of the body 110, and a nut portion 132, which is connected to the hood portion 131 so as to rotate around the body 110 and pushes or pulls the hood portion 131 along the longitudinal direction of the body 110. Due to a force with which the nut portion 132 pushes the hood portion 131 in the longitudinal direction of the body 110, the hood portion 131 presses the rear attachment leg 312 of the reel 300 to the body 110 at a lower side of the hood portion and clamps the rear attachment leg 312 to the body 110.

The hood portion 131 and the nut portion 132 are formed in an approximate ring shape and have a bore 133 coaxial with a central axis CA of the body 110 therein. The body 110 of the reel seat 100U passes through the bore 133. The nut portion 132 is threadedly coupled to the male thread 113 of the body 110 at the female thread 134 formed in an inner peripheral surface of the nut portion, and is moved frontward or rearward along the body 110 through screw motion. The hood portion 131 is pushed toward the fixed hood 120 or pulled away from the fixed hood 120 by the frontward or rearward movement of the nut portion 132.

The nut portion 132 has, in an inner peripheral surface of the end facing the hood portion 131, an engagement groove 135 for connection to the hood portion 131. The engagement groove 135 is formed in a circumferential direction of the inner peripheral surface of the nut portion 132. Further, the hood portion 131 has, at a base end BE facing the nut portion 132, a hook-shaped engagement protrusion 136 which is engaged with the engagement groove 135 of the nut portion 132. The engagement protrusion 136 extends at the base end BE of the hood portion 131 intermittently or continuously in the circumferential direction of the hood portion. The engagement protrusion 136 of the hood portion 131 is engaged with the engagement groove 135 of the nut portion 132, connecting the nut portion 132 to the hood portion 131 such that the nut portion 132 is rotatable around the central axis CA of the body 110. In some embodiments, the hood portion 131 may have the engagement groove 135, and the nut portion 132 may have the engagement protrusion 136.

Since the female thread 134 of the nut portion 132 is threadedly coupled to the male thread 113 of the body 110, if the nut portion 132 is rotated around the body 110 in one direction or a direction opposite to said one direction, then the nut portion 132 does a screw motion by the interaction between the male thread 113 and the female thread 134 and thus can be moved along the longitudinal direction of the body 110 while being rotated. By way of example, if the nut portion 132 is rotated in one direction so as to be moved toward the front end of the body 110 (toward the fixed hood 120), then, through the male thread 113 of the body 110 and the female thread 134 of the nut portion 132 which are threadedly coupled to each other, the nut portion 132 is moved toward the front end of the body 110 while being rotated around the body 110. Then, a front end surface of the nut portion 132 is contacted with the base end BE of the hood portion 131 and the nut portion 132 pushes the hood portion 131 toward the front end of the body 110. Due to the pushing force of the nut portion 132, the hood portion 131 presses the rear attachment leg 312 of the reel 300 against the seat portion 112 of the body 110 at a lower inner surface of the hood portion, and the hood portion 131 clamps the rear attachment leg 312 to the body 110. Further, if the nut portion 132 is rotated in a direction opposite to said one direction so as to be moved toward the rear end of the body 110, then the nut portion 132 is moved toward the rear end of the body 110 while being rotated around the body 110. Then, the engagement groove 135 of the nut portion 132 catches the engagement protrusion 136 and the nut portion 132 pulls the hood portion 131 toward the rear end of the body 110.

Figure 5:
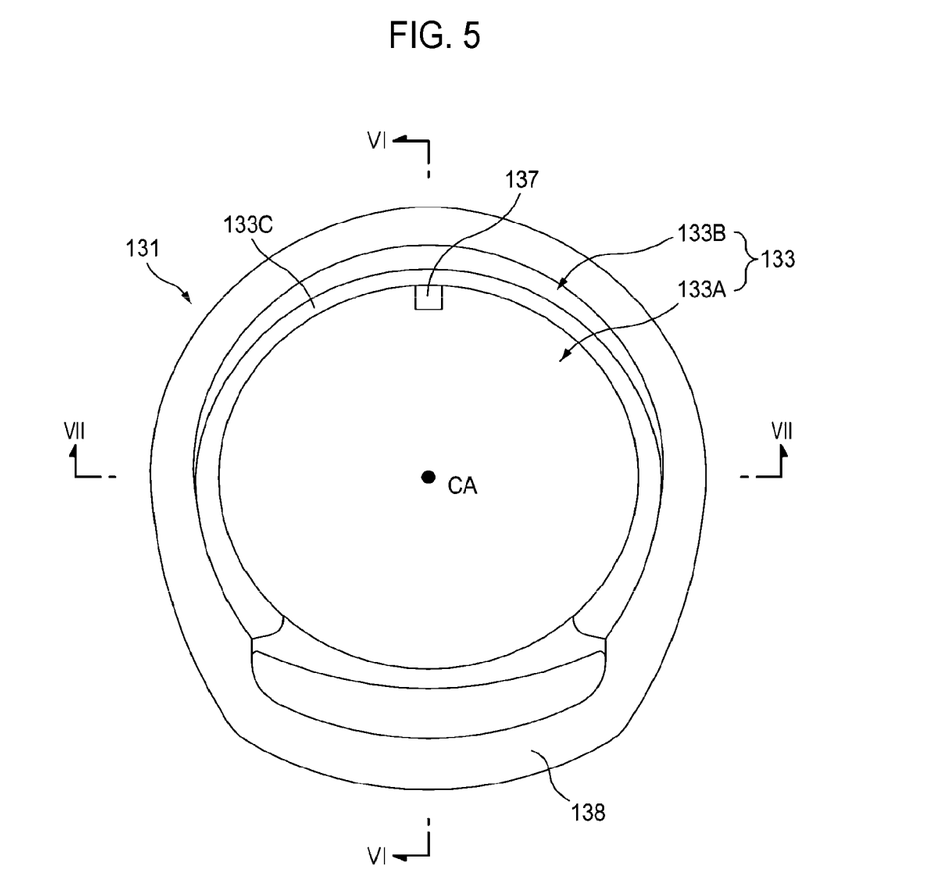
FIG. 5 is a front view of the movable hood shown in FIG. 3.
Figure 6:
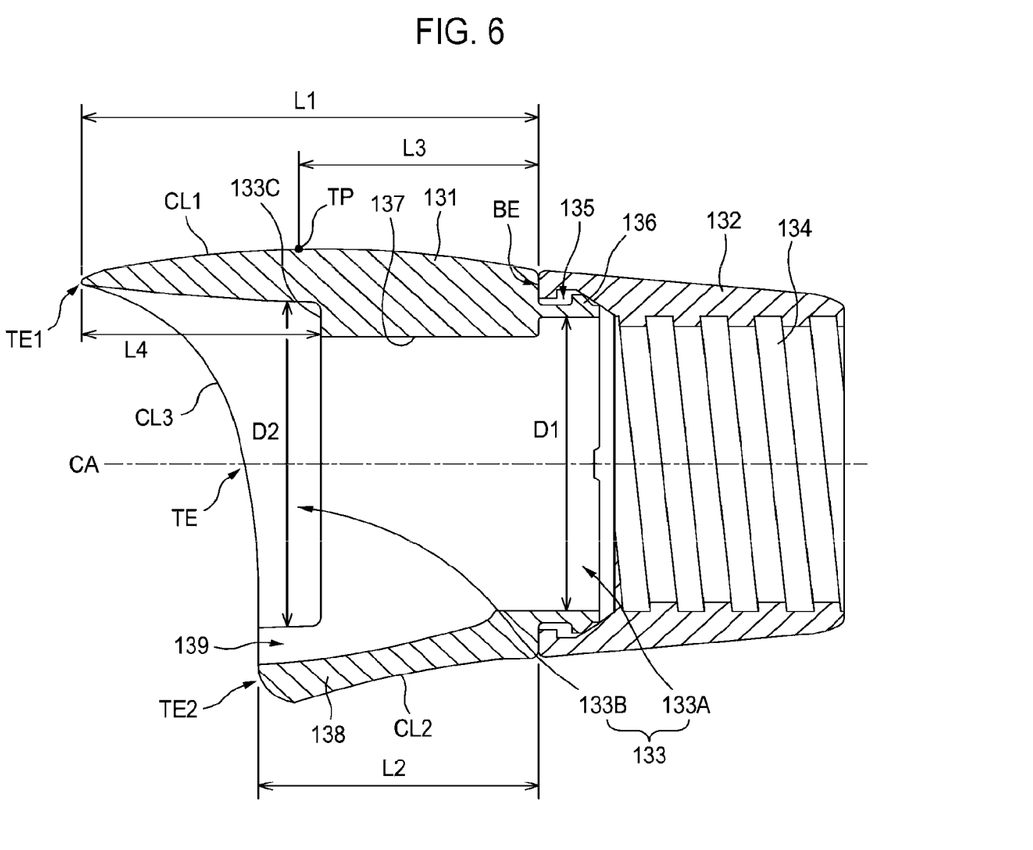
FIG. 6 is a sectional view taken along the line VI-VI of FIG. 5.
Figure 7:
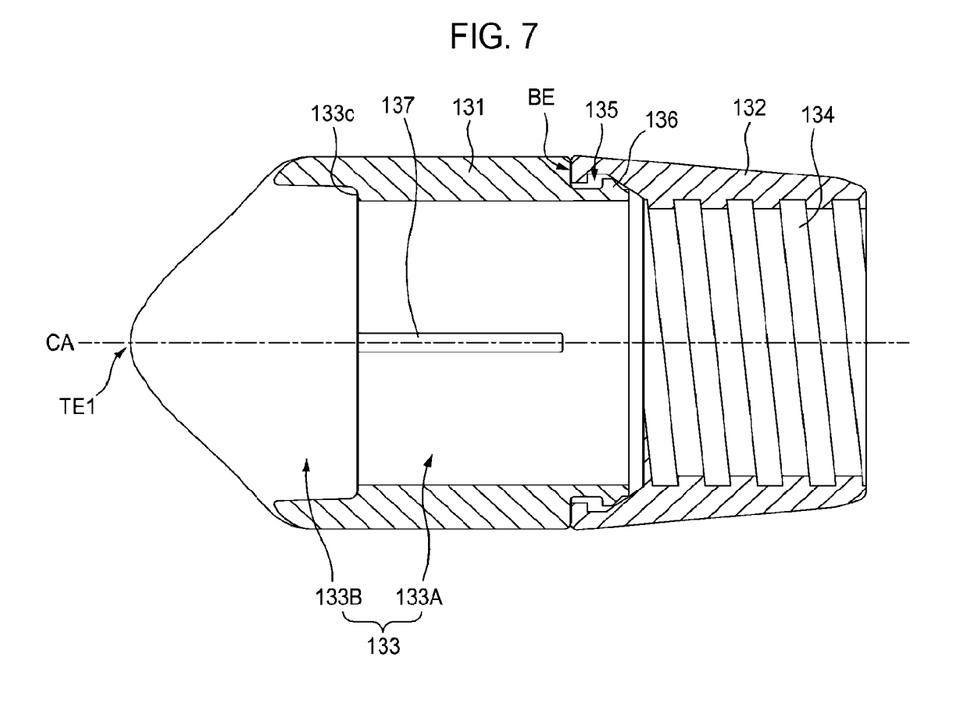
FIG. 7 is a sectional view taken along the line VII-VII of FIG. 5.

As to the above-described frontward or rearward movement of the hood portion 131, the hood portion 131 is linearly moved toward the front end or the rear end of the body 110 along the longitudinal direction of the body 110 without being rotated around the central axis CA of the body 110. Referring to FIGS. 5 and 6, to guide the linear movement of the hood portion 131, the movable hood 130 includes a guide projection 137 which projects from the upper inner surface of the hood portion 131 and is fitted to the guide groove 114 of the body 110. In some embodiments, the guide groove 114 may be provided at a portion of the body 110 other than the upper side of the body, and the guide projection 137 may project from the inner peripheral surface of the hood portion 131 corresponding to such a portion.

A lower half of the hood portion 131 protrudes downward more and more toward the front end, forming a cover portion 138 covering the rear attachment leg 312. Thus, a rear insertion cavity 139, to which the rear attachment leg 312 of the reel 300 is inserted, is defined between the cover portion 138 and the seat portion 112 of the body 110. The hood portion 131 presses the inclined surface 314 of the rear attachment leg 312 against the seat portion 112 at an inside surface of the cover portion 138.

Figure 4:
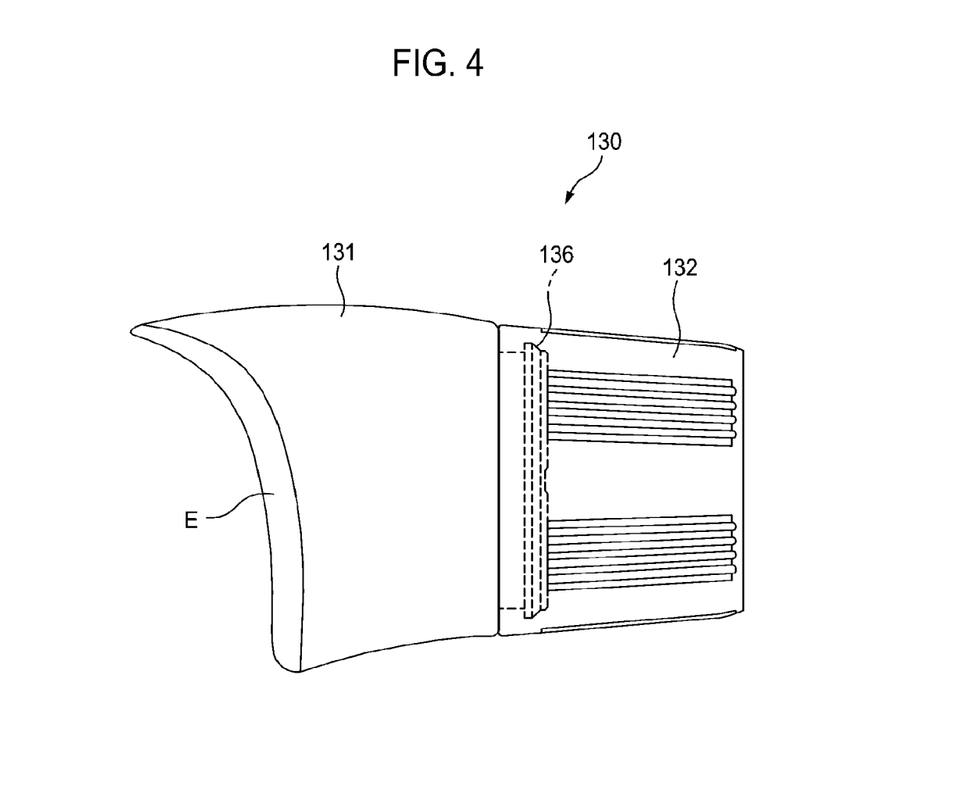
FIG. 4 is a side view of the movable hood shown in FIG. 3.

The hood portion 131 has the base end BE which faces the nut portion 132, and a leading end TE which is located opposite the base end BE. When viewing the hood portion 131 from the side, a length L1 of the upper side of the hood portion 131 from the base end BE to a leading end TE1 is longer than a length L2 of the lower side of the hood portion 131 from the base end BE to a leading end TE2. That is, an upper half of the hood portion 131 further protrudes toward a leading end thereof than a lower half of the hood portion. Therefore, the hood portion 131 has the upper side longer than the lower side which clamps the rear attachment leg 312 of the reel. By way of example, the length L1 of the upper side of the hood portion 131 is long enough to allow two fingers to lie on the upper side, and is 40 mm or less. If the length L1 of the upper side of the hood portion 131 exceeds 40 mm, then it is difficult to reduce the weight of the movable hood 130 and the strength of the hood portion 131 becomes weak due to the length excessively greater than the thickness. Further, when viewing the hood portion 131 from the side, an upper contour CL1 of the hood portion 131 includes an upward convex curve line. That is, when viewing the hood portion from the side, an upper outer surface of the hood portion 131 has a surface which is round and convex upward. The hood portion 131, the upper side of which is roundly convex, can contact a concavity which is formed in the user's palm when the user grips the reel seat 100U, thus eliminating a gap between the movable hood 130 and the user's palm. Further, in a reel seat 100D of a so-called down lock type wherein the movable hood 130 is located at the front end of the body 110 (toward the tip of the fishing rod) (see FIG. 8), the convex curve surface of the upper side of the hood portion 131 functions as a raised portion which the user's thumb presses. Therefore, the user can grip the reel seat while applying a strong force to the convex curve surface of the upper side of the hood portion 131.

When viewing the hood portion 131 from the side, a top point TP of the convex curve line, which the upper contour CL1 of the hood portion 131 has, is spaced away from the base end BE at a distance of 80% or less of the length L1 of the upper side of the hood portion 131. That is, when assuming a length from the base end BE to the top point TP as L3, (L3/L1)≤0.8. Where the top point TP is not located from the base end BE at a distance of 80% or less (i.e., where the top point TP is located from the base end BE at a distance exceeding 80% of the length L1 of the upper side), in the convex curve line which the upper contour CL1 of the upper side of the hood portion 131 has, a front side of the convex curve line located frontward from the top point TP becomes gentler than a rear side of the convex curve line located rearward from the top point TP. In such a case, when the user grips the fishing rod, the location of the convex portion of the hood portion 131 does not correspond to the concavity formed in the user's palm. If so, a holding feeling deteriorates. In addition, the convex curve line from the top point TP to the leading end TE1 has a steep slope and therefore makes a stepped shape toward the body 110. Then, the user can feel irritative and unpleasant feelings, and cannot hold the fishing rod with a stable grip feeling.

When viewing the hood portion 131 from the side, a contour CL3 between the leading end TE1 of the upper side of the hood portion 131 and the leading end TE2 of the lower side of the hood portion 131 includes a concave curve line which is concave toward the base end BE. Said concave curve line presented by the contour CL3 may gently curve from the leading end TE1 of the upper side of the hood portion 131 toward the leading end TE2 of the lower side, or may steeply curve and then gently curve from the leading end TE1 of the upper side of the hood portion 131 toward the leading end TE2 of the lower side.

When viewing the hood portion 131 from the side, a contour CL2 of the lower side of the hood portion 131 (i.e., a lower contour of the cover portion 138) includes an upward concave curve line. Thus, the user can grip the lower side of the hood portion 131 (the outer surface of the cover portion 138) by the user's fingers without an unpleasant feeling.

Further, a thickness of a leading edge portion E, which presents the contour CL3 between the upper and lower sides of the hood portion 131, gradually decreases away from the base end BE. Thus, such a thickness of the hood portion 131 can prevent a step portion from being created between the hood portion 131 and the body 110.

The bore 133 of the hood portion 131, through which the body 110 of the reel seat 100U passes, has a first bore 133A and a second bore 133B. The first bore 133A extends from the base end BE toward the leading end TE. Further, the second bore 133B has a diameter D2 greater than a diameter D1 of the first bore 133A and extends from the first bore 133A toward the leading end TE. Thus, when viewing the hood portion 131 from the front, a circular arc-shaped step portion 133C (see FIG. 5) is formed between the first bore 133A and the second bore 133B. A depth L4 from the leading end TE1 of the upper side of the hood portion 131 to the step portion 133C is in the range of 30% to 70% of the length L1 of the upper side of the hood portion 131. Where the depth L4 of the step portion 133C is less than 30% of the length L1 of the upper side of the hood portion 131, a force of the hood portion 131 retaining an auxiliary hood 150A, 150B (see FIGS. 11 to 13) is weakened and the auxiliary hood 150A, 150B tends to escape due to friction on the user's palm when the user swings the fishing rod. Further, where the depth L4 of the step portion 133C exceeds 70% of the length L1 of the upper side of the hood portion 131, the hood portion 131 becomes thin in the vicinity of the base end BE and thus a portion of the hood portion which is to be coupled to the nut portion 132 is not strong and can be broken.

Since the inside of the hood portion 131 is formed with two bores and the step portion 133C is formed between the two bores, the hood portion 131 can easily receive the auxiliary hood which will be described below. Further, since the hood portion 131 has the second bore 133B having a greater diameter via the step portion 133C, the movable hood 130 according to the embodiment can be mounted to a reel seat which has a step portion at a portion of a body to which a movable hold is installed, while covering such a step portion.

In the above-described hood portion 131, an overall length of the hood portion may be defined as the length L1 of the upper side of the hood portion 131. Further, an overall height of the hood portion 131 may be defined as a length between the top point TP of the upper side of the hood portion 131 and a lowermost portion of the cover portion 138. In order for the hood portion 131 to be strong enough to clamp the attachment leg of the reel 300 without increasing its weight and to have the above-described contours CL1, CL2 and CL3, the overall length of the hood portion 131 may be determined in the range of 2/3 to 5/2 of the diameter D1 of the first bore 133A and the overall height of the hood portion 131 may be determined to be up to 2.5 times of the diameter D1 of the first bore 133A.

Figure 8:
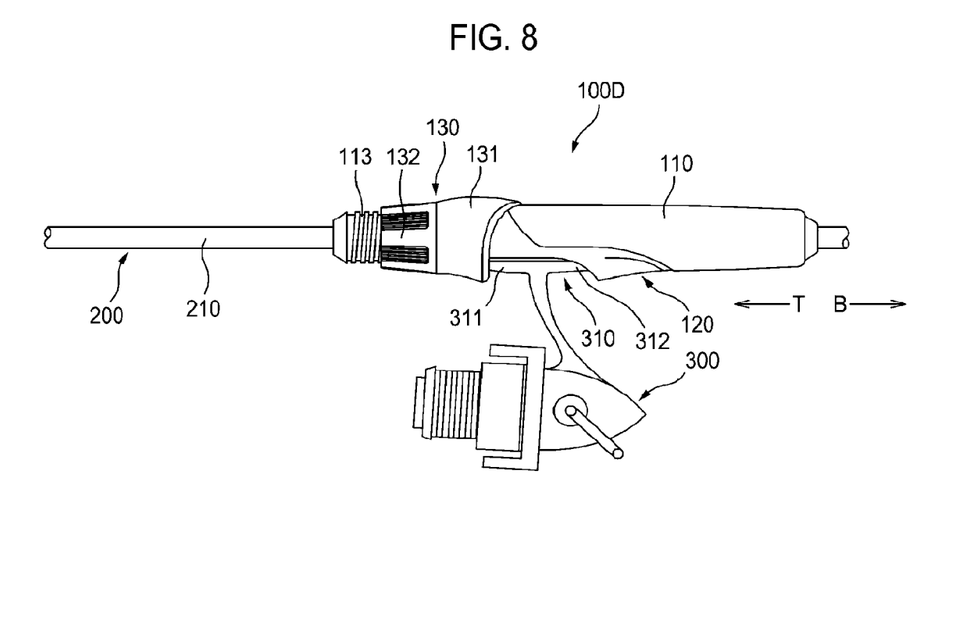
FIG. 8 is a side view showing that a movable hood according to an embodiment of the present disclosure is coupled to a front end portion of a reel seat and a reel is fixed to a reel seat through the movable hood.

FIG. 8 shows that the movable hood 130 according to the embodiment is coupled to the reel seat of a down lock type. In the reel seat 100D of a down lock type, the movable hood 130 is located at the front end of the reel seat 100D. The front attachment leg 311 of the reel 300 is clamped by the movable hood 130, while the rear attachment leg 312 of the reel 300 is clamped by the fixed hood 120. The reel seat 100D of a down lock type has a configuration similar to that of the reel seat 100U of an up lock type except that the position of the movable hood 130 and the position of the male thread 113 are reverse to those of the reel seat 100U of an up lock type.

The grip feeling which the reel seat 100U, 100D including the movable hood 130 according to the embodiment provides is described with reference to FIGS. 9 and 10.

Figure 9:
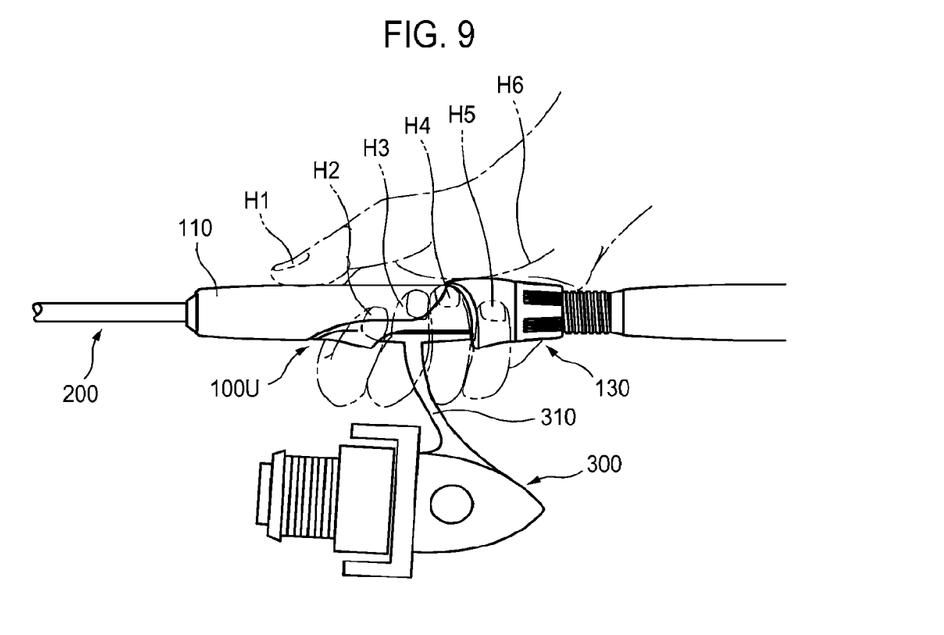
FIG. 9 shows a usage example of the reel seat shown in FIG. 3.
Figure 10:
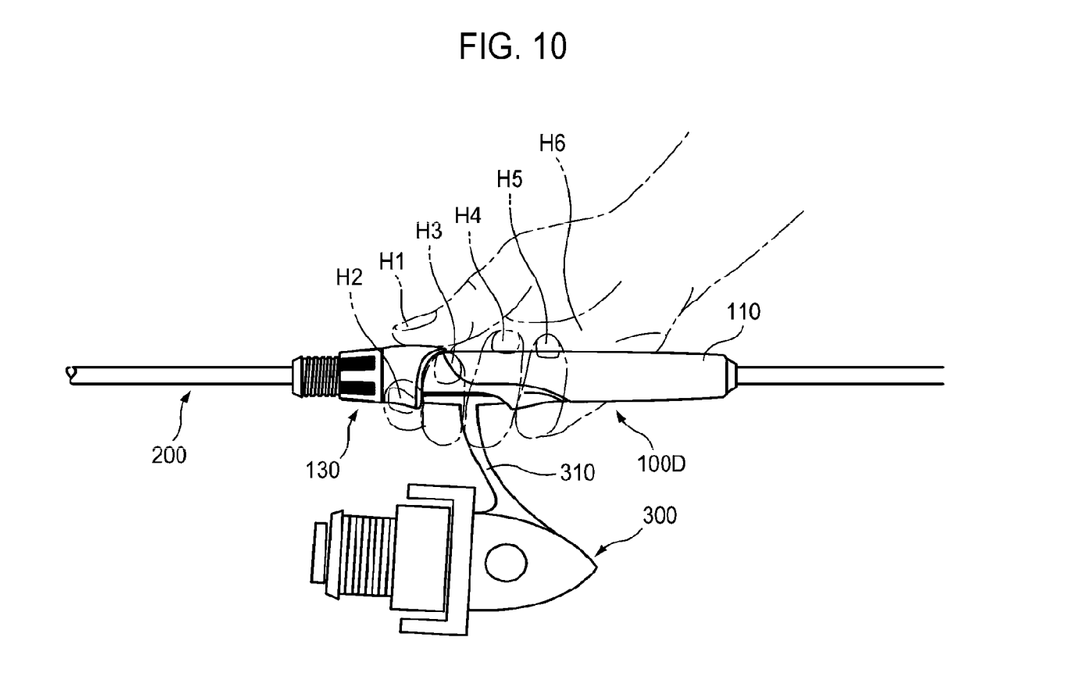
FIG. 10 shows a usage example of the reel seat shown in FIG. 8.

FIG. 9 shows an example of using the reel seat 100U of an up lock type, and FIG. 10 shows an example of using the reel seat 100D of a down lock type. When the user grips the reel seat 100U, 100D, the user often grips the reel seat 100U, 100D with the attachment leg 310 inserted in between a middle finger H3 and a ring finger H4. In this embodiment, the user lightly holds the reel seat 100U, 100D with the middle finger H3 and holds the reel seat 100U, 100D with the ring finger H4 and a pinkie finger H5. Further, a thumb finger H1 presses the upper surface of the body 110 (see FIG. 9) or presses the upper surface of the hood portion 131 of the movable hood 130 (see FIG. 10). A palm H6 is located on the hood portion 131 (see FIG. 9) or is contacted with the upper surface of the body 110 (see FIG. 10).

In the usage example of the reel seat 100U of an up lock type shown in FIG. 9, the palm H6 is contacted with the upper surface of the hood portion 131 of the movable hood 130 and the pinkie finger H5 is contacted with the lower surface of the hood portion 131. Further, the ring finger H4 is located at the leading end TE of the hood portion 131. The upward convex curve surface of the upper side of the hood portion 131 is contacted with the palm H6, thus eliminating the gap between the hood portion 131 and the palm H6. Accordingly, the user can firmly grip the reel seat 100U. Further, the ring finger H4 is positioned between the attachment leg 310 of the reel and the leading end TE of the hood portion 131 along the contour CL3 of the leading end TE of the hood portion 131 which is concave toward the nut portion 132. Thus, the ring finger H4 is fixed, and the reel seat 100U cannot move in the user's hand when the user strongly swings the fishing rod 200. Further, since the pinkie finger H5 is caught by the upward concave contour CL2 of the lower side of the hood portion 131, the user can grip the reel seat 100U with a stable and enhanced grip feeling.

In the usage example of the reel seat 100D of a down lock type shown in FIG. 10, the thumb finger H1 is in contact with the contour CL1 of the hood portion 131, which is an upward convex curve line, and an index finger H2 is in contact with the contour CL2 of the lower side of the hood portion 131, which is an upward concave curve line. Further, the middle finger H3 is positioned along the contour CL3 of the hood portion 131 which is concave toward the nut portion 132. Since the thumb finger H1 is in contact with the convex curve surface of the upper side of the hood portion 131, the user can strengthen the pressing force of the thumb finger H1, and therefore the user can strongly swing down the fishing rod 200. Further, since the index finger H2 is caught by the upward concave contour CL2 of the lower side of the hood portion 131, the user can grip the reel seat 100D with a stable and enhanced grip feeling and can strongly swing up the fishing rod 200. Further, since the middle finger H3 is positioned along the contour CL3 of the leading end TE of the hood portion 131 which is concave toward the nut portion 132, the middle finger H3 is fixed, and the reel seat 100U cannot move in the user's hand when the user strongly swings the fishing rod 200. As described above, the movable hood 130 according to the embodiment is applied to both the reel seat 100U of an up lock type and the reel seat 100D of a down lock type and enhances a grip feeling and a holding feeling while reducing an unpleasant feeling applied to the user's hand.

Figure 11:
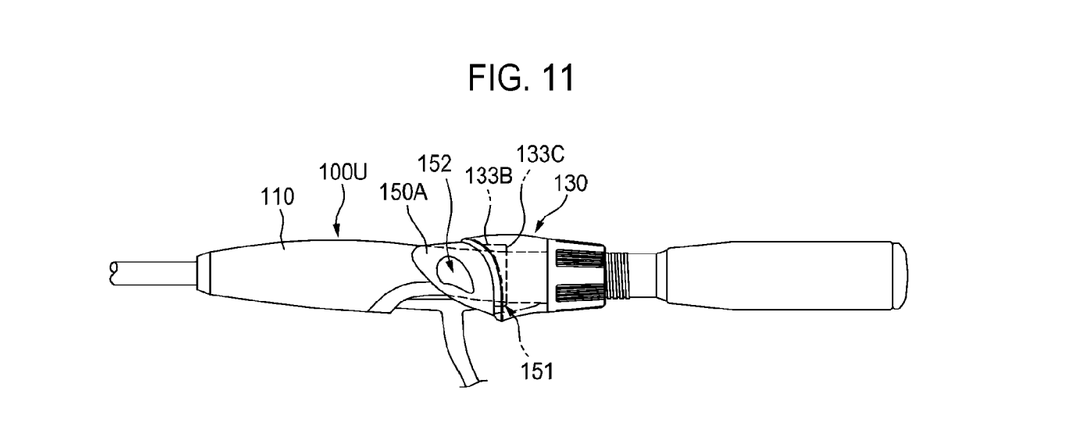
FIG. 11 is a side view showing a movable hood according to an embodiment of the present disclosure, to which an auxiliary hood is coupled.
Figure 12:
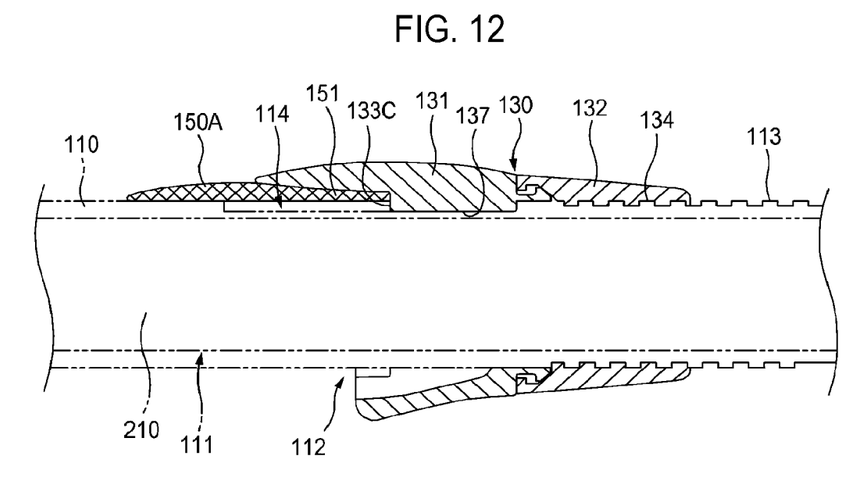
FIG. 12 is a partial longitudinal sectional view showing a movable hood and an auxiliary hood.
Figure 13:
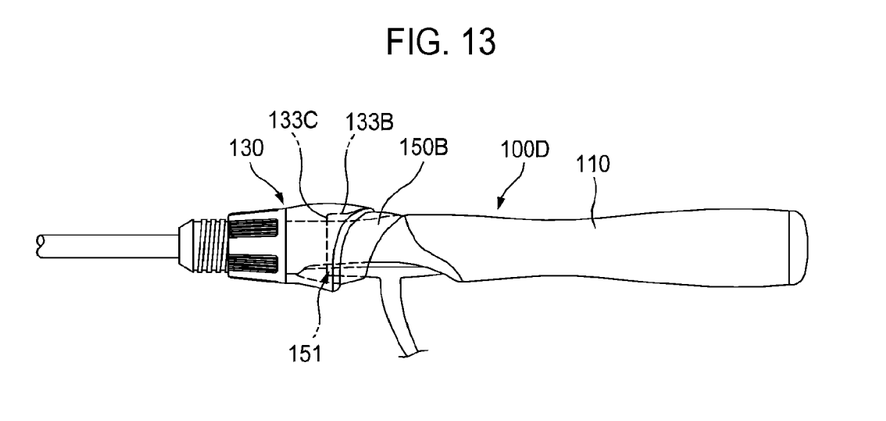
FIG. 13 is a side view showing a movable hood according to an embodiment of the present disclosure, to which an auxiliary hood of another example is coupled.

FIGS. 11 to 13 show an auxiliary hood which is fitted to the movable hood.

To assist the user's various hand shapes, various positions of fingers, etc. and to more enhance a grip feeling, the movable hood 130 according to the embodiment includes an auxiliary hood 150A, 150B which is interposed between the body 110 of the reel seat and the hood portion 131. Through the auxiliary hood 150A, 150B, the user's fingers can be guided to the body 110 of the reel seat when the user grips the reel seat 100U, 100D.

Referring to FIGS. 11 to 13, the auxiliary hood 150A, 150B has a ring shape so as to surround the circumference of the body 110. In such a case, an inner diameter of the auxiliary hood 150A, 150B has a proper size to receive the body 110 and the front attachment leg 311 or the rear attachment leg 312 of the reel therein. The auxiliary hood 150A, 150B may have a C-shaped cross-sectional shape so as to partially cover the body 110. The auxiliary hood 150A, 150B is made of a material from which the user can feel a friction feeling and a cushion feeling. By way of example, the auxiliary hood 150A, 150B may be made of a rubber material which has a superior elasticity such that the auxiliary hood can be closely contacted with the body 110. Further, the surface of the auxiliary hood 150A, 150B may be embossed so as to provide a special grip feeling.

A portion of the auxiliary hood 150A, 150B is fitted in between the outer peripheral surface of the body 110 of the reel seat 100U, 100D and the inner peripheral surface of the hood portion 131 of the movable hood 130. That is, the auxiliary hood 150A, 150B has an insertion portion 151 which is fitted in between the second bore 133B of the hood portion 131 and the outer peripheral surface of the body 110 of the reel seat. The insertion portion 151 of the auxiliary hood 150A, 150B are also formed in a ring shape. The insertion portion 151 is in contact with the step portion 133C of the hood portion 131 at its leading end when the auxiliary hood 150A or 150B is fitted to the hood portion 131. When the auxiliary hood 150A, 150B is inserted to the hood portion 131, the step portion 133C of the hood portion 131 functions as a stopper against the insertion portion 151. Thus, the auxiliary hood 150A, 150B can be fixed between the hood portion 131 and the body 110 at a predetermined position. Further, as shown in FIG. 11, the auxiliary hood 150A may have an opening or recess 152 at its lateral side. For example, an end of the user's middle finger H3 can be positioned at the opening or recess 152, thus enhancing a grip force.

The auxiliary hood 150A, 150B is interposed between the hood portion 131 of the movable hood 130 and the body 110 of the reel seat 100U, 100D. Thus, if the auxiliary hood 150A, 150B is applied to a reel seat wherein the aforementioned stepped portion or gap exists between a body and a movable hood, then such stepped portion or gap can be filled. Further, since the user's fingers can be guided along a contour of the auxiliary hood 150A, 150B, the user can suitably change a grip style in accordance with the user's hand size or gripping force and can grip the reel seat 100U, 100D with a good grip feeling. As such, by coupling the auxiliary hood 150A, 150B to the movable hood 130, the user can make broad choices on reel seats to which the movable hood 130 is employed. Further, makers can accomplish their own movable hoods and reel seats through the auxiliary hood 150A, 150B.

The present disclosure described heretofore should not be limited to the above-described embodiments and the accompanying drawings. It will be apparent to those of ordinary skill in the technical field to which the present disclosure pertains, that various substitutions, modifications and alternations may be made without departing from the technical idea of the present disclosure.

DESCRIPTION OF REFERENCE SYMBOLS

100U, 100D reel seat, 110 body, 111 bore, 112 seat portion, 113 male thread, 114 guide groove, 120 fixed hood, 121 front insertion cavity, 122 cover portion, 130 movable hood, 131 hood portion, 132 nut portion, 133 bore, 133A first bore, 133B second bore, 133C step portion, 134 female thread, 135 engagement groove, 136 engagement protrusion, 137 guide projection, 138 cover portion, 139 rear insertion cavity, 150A, 150B auxiliary hood, 151 insertion portion, 152 recess, 200 fishing rod, 300 reel, 310 attachment leg of reel, BE base end of hood portion, TE leading end of hood portion, CL1 upper contour, CL2 lower contour, CL3 leading end contour

What is claimed is:

1. A movable hood for a reel seat, comprising:
a hood portion through which a body of the reel seat passes, the hood portion being movable in a longitudinal direction of the body and clamping an attachment leg of a reel to the body at a lower side; and
a nut portion connected to the hood portion so as to rotate around the body, the nut portion being threadedly coupled to an outer peripheral surface of the body at an inner peripheral surface,
wherein the hood portion has a base end facing the nut portion and a leading end located opposite the base end,
wherein when viewing the hood portion from a side, a length of an upper side of the hood portion from the base end to the leading end is longer than a length of the lower side of the hood portion from the base end to the leading end,
wherein when viewing the hood portion from the side, an entirety of an upper contour of the hood portion is an upward convex curve line, the upward convex curve line extending from the base end to the leading end,
wherein when viewing the hood portion from the side, a contour of the leading end between the upper side and the lower side is a concave curve line toward the base end,
wherein the hood portion includes first and second bores through which the body of the reel seat passes,
wherein the first bore extends from the base end toward the leading end, a central axis of the first bore extending coaxially with a central axis of the body,
wherein the second bore has a diameter greater than a diameter of the first bore and extends from the first bore toward the leading end, a central axis of the second bore extending coaxially with the central axis of the body, and
wherein when viewing the hood portion from a front, a step portion is formed between the first bore and the second bore.

2. The movable hood for a reel seat of claim 1, wherein a top point of the convex curve line is located from the base end at a distance of 80% or less of the length of the upper side from the base end to the leading end.

3. The movable hood for a reel seat of claim 1, wherein when viewing the hood portion from the side, a lower contour of the hood portion includes an upward concave curve line.

4. The movable hood for a reel seat of claim 1, wherein a depth from the leading end to the step portion is in a range of 30% to 70% of the length of the upper side from the base end to the leading end.

5. The movable hood for a reel seat of claim 1, further comprising an auxiliary hood, at least a portion of which is fitted in between the outer peripheral surface of the body of the reel seat and an inner peripheral surface of the hood portion, and
wherein the at least portion of the auxiliary hood has an insertion portion fitted in between the body of the reel seat and the second bore.

6. The movable hood for a reel seat of claim 5, wherein the auxiliary hood has an opening or recess at a lateral side.

7. The movable hood for a reel seat of claim 1, wherein the length of the upper side from the base end to the leading end is 40 mm or less.

8. A reel seat, comprising:
a body including a seat portion, on which a pair of attachment legs of a reel are seated, at a lower side, and a male thread in an outer peripheral surface of one end portion, a portion of a fishing rod passing through the body in a longitudinal direction;
a movable hood located at one of both ends in the longitudinal direction of the body and clamping one of the pair of attachment legs to the seat portion of the body; and
a fixed hood located at the body opposite the movable hood for the reel seat and clamping the other of the pair of the attachment legs to the seat portion of the body,
wherein the movable hood comprises:
a hood portion through which the body passes, the hood portion being movable in the longitudinal direction and clamping the one of the pair of attachment legs to the seat portion at a lower side; and
a nut portion connected to the hood portion so as to rotate around the body, the nut portion being threadedly coupled to the male thread of the body at an inner peripheral surface,
wherein the hood portion has a base end facing the nut portion and a leading end located opposite the base end,
wherein when viewing the hood portion from a side, a length of an upper side of the hood portion from the base end to the leading end is longer than a length of the lower side of the hood portion from the base end of the leading end,
wherein when viewing the hood portion from the side, an entirety of an upper contour of the hood portion is an upward convex curve line, the upward convex curve line extending from the base end to the leading end,
wherein when viewing the hood portion from the side, a contour of the leading end between the upper side and the lower side is a concave curve line toward the base end,
wherein the hood portion includes first and second bores through which the body passes,
wherein the first bore extends coaxially from the base end toward the leading end, a central axis of the first bore extending coaxially with a central axis of the body,
wherein the second bore has a diameter greater than a diameter of the first bore and extends from the first bore toward the leading end, a central axis of the second bore extending coaxially with the central axis of the body, and
wherein when viewing the hood portion from a front, a step portion is formed between the first bore and the second bore.

9. A fishing rod including the movable hood for the reel set of claim 1.

10. The fishing rod including the reel seat of claim 8.

11. The movable hood for a reel seat of claim 1, wherein another step portion is formed between the first bore and the second bore near the leading end.

12. The reel seat of claim 8, wherein another step portion is formed between the first bore and the second bore near the leading end.

* * * * *